(12) United States Patent
Sun et al.

(10) Patent No.: US 10,696,696 B1
(45) Date of Patent: Jun. 30, 2020

(54) METHOD FOR PREPARING PHENYLBORONIC ACID NEOPENTYL GLYCOL ESTER

(71) Applicant: SOOCHOW UNIVERSITY, Suzhou (CN)

(72) Inventors: Hongmei Sun, Suzhou (CN); Jin Xu, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 161 days.

(21) Appl. No.: 16/091,520

(22) PCT Filed: Apr. 8, 2016

(86) PCT No.: PCT/CN2016/078914
§ 371 (c)(1),
(2) Date: Oct. 4, 2018

(87) PCT Pub. No.: WO2017/173668
PCT Pub. Date: Oct. 12, 2017

(51) Int. Cl.
*C07F 5/02* (2006.01)
*C07F 15/04* (2006.01)
*B01J 31/22* (2006.01)
*B01J 31/18* (2006.01)
*B01J 37/04* (2006.01)

(52) U.S. Cl.
CPC ............ *C07F 5/025* (2013.01); *B01J 31/185* (2013.01); *B01J 31/2273* (2013.01); *B01J 37/04* (2013.01); *C07F 15/04* (2013.01); *B01J 2231/48* (2013.01); *B01J 2531/847* (2013.01)

(58) Field of Classification Search
CPC ....... C07F 5/025; C07F 15/04; B01J 31/2273; B01J 31/185; B01J 37/04; B01J 2231/48; B01J 2531/847
See application file for complete search history.

(56) References Cited

U.S. PATENT DOCUMENTS 6,399,779 B1 * 6/2002 Marcuccio ............ C07C 231/12
546/257

FOREIGN PATENT DOCUMENTS

| CN | 101591360 A | 12/2009 |
|---|---|---|
| CN | 103570753 A | 2/2014 |
| CN | 104327106 A | 2/2015 |
| CN | 105061124 A | 11/2015 |
| CN | 105859795 A | 8/2016 |
| CN | 105732684 A | 7/2017 |

* cited by examiner

*Primary Examiner* — Rosalynd A Keys
(74) *Attorney, Agent, or Firm* — SZDC Law P.C.

(57) ABSTRACT

The present invention discloses a method for preparing a phenylboronic acid neopentyl glycol ester. A mixed nickel (II) complex with a formula of $Ni[P(OR^1)_3][(R^2NCH_2CH_2NR^2)C]X_2$ is used as a catalyst. The method comprises: in the presence of potassium methoxide, efficiently catalyze a cross coupling reaction between a phenyl chloride and a bis(neopentyl glycolato)-diboron to prepare a phenylboronic acid neopentyl glycol ester. The invention provides the first embodiment of using a mixed nickel(II) complex with phosphonate ester and nitrogen heterocyclic carbene ancillary ligands to catalyze a cross coupling reaction.

6 Claims, No Drawings

METHOD FOR PREPARING PHENYLBORONIC ACID NEOPENTYL GLYCOL ESTER

This application is a the national stage PCT/CN2016/078914, filed on Apr. 8, 2016.

TECHNICAL FIELD

The invention belongs to the technical field of organic synthesis, and in particular relates to a method for preparing phenylboronic acid neopentyl glycol ester.

BACKGROUND TECHNIQUE

Aryl borate compounds are a class of synthetic intermediates that are very important in the field of organic synthesis, so how to easily and efficiently synthesize various types of aryl boronate compounds has received continuous attention (see: Boronic Acids; Hall, DG; Wiley-VCH: Weinheim, Germany, 2005). The traditional method for synthesizing aryl borate is to react a halogenated aromatic hydrocarbon with a trialkyl borate under the action of a metal organic reagent such as an organozinc reagent, Grignard reagent, but there are many limitations for this method requires sensitive metal organic reagents (see: Suzuki, A.; Brown, HC Organic Syntheses via Boranes; Aldrich Chemical Co.: Milwaukee, 2003; Vol. 3). In order to avoid the use of the above-mentioned metal organic reagents, a cross-coupling reaction of a transition metal-catalyzed halogenated aromatic hydrocarbon and a boron reagent has been developed to synthesize an aryl boronic acid ester, and a palladium-based catalyst is used in a large amount (see: Ishiyama, T Murata, M.; Miyaura, N.; J. Org. Chem. 1995, 60, 7508); however, the use of palladium-based catalysts also has some disadvantages, most notably its expensive price.

Nickel based catalysts are very inexpensive compared to expensive palladium based catalysts and have significant cost advantages in industrial applications. Therefore, the development of nickel-based catalysts to achieve cross-coupling reaction of halogenated aromatic hydrocarbons with boron reagents to synthesize aryl boronic esters has received increasing attention. For example, a catalytic system consisting of 1,3-bis(diphenylphosphino)propyldichlorochloride and 1,3-bis(diphenyl-phosphino) propane can be used to achieve cross-coupling of brominated aromatic hydrocarbons and neopentyl glycol boron; catalytic system consisting of 1,3-bis(diphenylphosphino)propyldichloronickel and 1,1'-bis(diphenylphosphino) ferrocene, with zinc powder as an additive can efficiently catalyze the cross-coupling reaction of iodo-or-bromine aromatic with neopentyl glycol borane, which has better substrate suitability and higher catalytic efficiency. These results indicate that the relatively inexpensive nickel-based catalysts have great application prospects in the cross-coupling reaction of halogenated hydrocarbons with boron reagents for the synthesis of aryl boronate compounds, but these methods also have certain drawbacks, such as high reaction temperature of 100° C., and a catalyst amount of 10 mol %, and in particular, there is a problem that it cannot be widely applied to chlorinated aromatic hydrocarbon having a low activity but a relatively inexpensive and wide variety.

Cross-coupling reaction of chlorinated aromatic hydrocarbons and boronic acid pinacol ester can be obtained by using cesium fluoride as a alkali, trimethyl (2,2,2-trifluoroethoxy)silane as an additive and bis(trimethylphosphine) nickel dichloride as a catalyst, but the reaction temperature of the method still requires a high temperature of 100° C., and requires the use of more toxic trimethyl phosphine and more expensive additives. Using diisopropylethylamine as a base, the cross-coupling reaction of brominated aromatic hydrocarbons and chlorinated aromatic hydrocarbons with tetrahydroxydiboron to prepare aromatic boron acid can be carried out by using a catalytic system composed of 1,3-bis(diphenylphosphino)propyldichlorochloride and triphenylphosphine.

Technical Problem

Compared with the previous method, this method also has some drawbacks, mainly: (1) the use of more toxic triphenylphosphine; (2) the substrate involved is mostly brominated aromatics, lower active, but cheaper, readily available chlorinated aromatics involve relatively less; (3) still require higher reaction temperatures for most chlorinated aromatic substrates, and the like. Therefore, it is necessary to develop more catalytic systems to efficiently catalyze the cross-coupling reaction of halogenated aromatic hydrocarbons, especially chlorinated aromatic hydrocarbons with boron reagents. So far, there have been no reports of mixed nickel(II) complexes containing phosphites and nitrogen heterocyclic carbene, nor have they been used to catalyze the cross-coupling between chlorinated aromatic hydrocarbons and bis(neopentyl glycolato)-diboron.

Means for Solving the Problem

Technical Solutions

It is an object of the present invention to provide a highly efficient catalyzed cross coupling reaction between a phenyl chloride and a bis(neopentyl glycolato)-diboron to prepare a phenylboronic acid neopentyl glycol ester using a mixed nickel(II) complex containing a phosphite and a nitrogen heterocyclic carbene in the presence of potassium methoxide which has significantly better catalytic activity and substrate suitability than the prior art.

In order to achieve the above object, the technical scheme adopted by the present invention is: a method for preparing phenylboronic acid neopentyl glycol ester, comprising the steps of: sequentially adding catalyst, potassium methoxide, bis(neopentyl glycolato)-diboron, phenyl chloride and organic solvent in an inert gas atmosphere; reacting at 40° C. for 6 hours to obtain phenylboronic acid neopentyl glycol ester; the phenyl chloride is p-chlorophenol, p-chloroaniline, p-chlorobenzophenone or p-cyanochlorobenzene; the catalyst is used in an amount of 5% by mole of the phenyl chloride; the chemical structure of the catalyst is as follows:

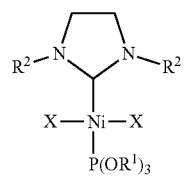

Wherein $R^1$ is ethyl or isopropyl; $R^2$ is 2,4,6-trimethylphenyl, 2,6-diisopropylphenyl or tert-butyl; and X is bromine or chlorine.

After completion of the reaction, the reaction was terminated with water, and the reaction product was extracted with ethyl acetate and carried out column chromatography purification to carry out quantitative analysis to obtain the product yield.

In the above technical scheme, the inert gas is argon.

The chemical formula of the catalyst in the present invention is $Ni[P(OR^1)_3][(R^2NCH_2CH_2NR^2)C]X_2$; the preparation method thereof is specifically as follows:

When X is bromine, the method for preparing the above mixed nickel(II) complex comprises the steps of dissolving bis(phosphite) nickel dibromide and nitrogen heterocyclic carbene in a solvent in an inert gas, the reaction is carried out at room temperature for 2 to 4 hours; then the solvent is removed in vacuo, the residue is extracted with toluene after washed with n-hexane, and the clear solution was transferred and removed the solvent toluene to obtain nickel (II) complex, which is the above-mentioned mixed nickel (II) complex containing phosphite ester and nitrogen heterocyclic carbene.

When X is chlorine, the method for preparing the above mixed nickel(II) complex comprises the steps of dissolving bis(triphenylphosphine)nickel dichloride and nitrogen heterocyclic carbene in a solvent in an inert gas, the reaction is carried out at room temperature for 2 to 4 hours; then the solvent is removed in vacuo, the residue is extracted with toluene after washed with n-hexane, and the clear solution was transferred and removed the solvent toluene to obtain nickel(II) complex containing triphenylphosphine and nitrogen heterocyclic carbene. Then, the mixed nickel(II) complex and the phosphite are dissolved in a solvent and reacted at room temperature for 1 hour; then the solvent is removed in vacuo, and the residue is extracted with toluene after washed with n-hexane, and the clear solution was transferred and removed the solvent toluene gives nickel(II) complex, which is the above-mentioned mixed nickel (II) complex containing phosphite ester and nitrogen heterocyclic carbene.

In the above technical scheme of catalyst preparation, the inert gas is argon; the molar ratio of bis(phosphite) nickel dibromide to nitrogen heterocyclic carbene is 1:1; the molar ratio of bis(triphenylphosphine)nickel dichloride and nitrogen heterocyclic carbene is 1:1; the molar ratio of the mixed nickel(II) complex containing triphenylphosphine and nitrogen heterocyclic carbene to the phosphite is 1:1; the solvent is tetrahydrofuran. The selection basis of the solvent is that nitrogen heterocyclic carbene can be dissolved, and the mixed nickel(II) complex containing the phosphite ester and the nitrogen heterocyclic carbene ligand can also be dissolved, and the mixed nickel(II) complex containing triphenylphosphine and nitrogen heterocyclic carbene can also be dissolved; and no active hydrogen. For example, tetrahydrofuran.

In the above technical scheme, the molar ratio of the catalyst, potassium methoxide, bis(neopentyl glycolato)-diboron and phenyl chloride is 0.05:1.5:1.5:1. The invention can be obtained phenylboronic acid neopentyl glycol ester in a higher yield under the shorter reaction time and mild reaction temperature, less catalyst dosage, which greatly optimizes the reaction conditions and improves the product yield.

Beneficial Effects of the Invention

Beneficial Effects

The catalyst disclosed in the present invention introduces a phosphite ligand for the first time, and the substituents in the phosphite or nitrogen heterocyclic carbene can be variously selected, thereby a novel high-efficiency catalyst can be sent out; and can efficiently catalyze the cross-coupling reaction of phenyl chloride with bis(neopentyl glycolato)-diboron to synthesize phenylboronic acid neopentyl glycol ester in the presence of potassium methoxide, its catalytic activity and substrate suitability are better than the prior art; the reaction is simple and easy to operate, the product is easy to extract, and the yield is high. These complexes have a well-defined structure and are relatively stable solid in air, which is advantageous for large-scale synthesis and application.

EXAMPLES FOR THE INVENTION

Detailed Description of the Embodiments

The present invention is further described below in conjunction with the embodiments:

Example 1: Synthesis of $Ni[P(OR^1)_3]$ $[(R^2NCH_2CH_2NR^2)C]X_2$ ($R^1=CH_2CH_3$, $R^2=2,4,6$-trimethylphenyl, X=Br)

Add a nitrogen heterocyclic carbene $(R^2NCH_2CH_2NR^2)$ C (0.2464 g, 0.8 mmol) to the solution of di(triethyl phosphite) nickel dibromide (0.4400 g, 0.8 mmol) in tetrahydrofuran, react at room temperature for 2 hours, the solvent was removed in vacuum, the residue was washed with n-hexane, and the obtained residue is extracted by toluene, and the clear liquid is transferred, and solvent toluene is removed, so as to obtain a red solid, wherein the yield is 68%.

The results of elemental analysis of the product are shown in Table 1:

TABLE 1

| | Elemental analysis results | | |
|---|---|---|---|
| | C: (%) | H: (%) | N: (%) |
| Theoretical value | 46.86 | 6.12 | 4.05 |
| Actual value | 47.04 | 6.21 | 3.99 |

The product was subjected to nuclear magnetic characterization and the results are as follows:

The product was dissolved in $C_6D_6$ (ca. 0.4 mL), sealed, and characterized by Unity Inova-400 NMR apparatus at room temperature: $^1H$ NMR (400 MHz, $C_6D_6$): δ 6.88 (s, 4H), 3.97 (s, 6H), 3.13 (s, 4H), 2.64 (s, 12H), 2.15 (s, 6H), 1.02 (s, 9H) ppm.

Example 2: Synthesis of $Ni[P(OR^1)_3]$ $[(R^2NCH_2CH_2NR^2)C]X_2=CH_2CH_3$, $R^2=2,6$-diisopropylphenyl, X=Br)

Add a nitrogen heterocyclic carbene $(R^2NCH_2CH_2NR^2)$ C (0.3627 g, 0.93 mmol) to a solution of bis(triethyl phosphite) nickel dibromide (0.5115 g, 0.93 mmol) in tetrahydrofuran, react at room temperature for 2 hours, the solvent was removed in vacuum, the residue was washed with n-hexane, and the obtained residue is extracted by toluene, and the clear liquid is transferred, and solvent toluene is removed, so as to obtain a red crystals, wherein the yield is 77%.

The results of elemental analysis of the product are shown in Table 2:

TABLE 2

| Elemental analysis | | | |
| --- | --- | --- | --- |
| | C: (%) | H: (%) | N: (%) |
| Theoretical value | 51.06 | 7.01 | 3.61 |
| Actual value | 51.33 | 7.19 | 3.49 |

The product was subjected to nuclear magnetic characterization and the results are as follows:

The product was dissolved in $C_6D_6$ (ca. 0.4 mL), sealed, and characterized by Unity Inova-400 NMR apparatus at room temperature: $^1$H NMR (400 MHz, $C_6D_6$): δ 7.29 (s, 6H), 3.91 (d, 6H), 3.88-3.71 (m, 4H), 3.58 (s, 4H), 1.75 (d, 12H), 1.18 (d, 12H), 1.02 (s, 9H) ppm.

Example 3: Synthesis of Ni[P(OR$^1$)$_3$][(R$^2$NCH$_2$CH$_2$NR$^2$)C]X$_2$=CH(CH$_3$)$_2$, R$^2$=2,6-diisopropylphenyl, X=Br)

Add a nitrogen heterocyclic carbene (R$^2$NCH$_2$CH$_2$NR$^2$)C (0.3627 g, 0.93 mmol) to a solution of di(triisopropyl phosphite) nickel dibromide (0.5905 g, 0.93 mmol) in tetrahydrofuran, and react at room temperature for 3 hours. The solvent was removed in vacuo, and the residue was washed with n-hexane, and the residue obtained was extracted with toluene, and the clear liquid was transferred and remove the solvent toluene to give red-black crystals in a yield of 70%.

The results of elemental analysis of the product are shown in Table 3:

TABLE 3

| Elemental analysis | | | |
| --- | --- | --- | --- |
| | C: (%) | H: (%) | N: (%) |
| Theoretical value | 52.84 | 7.39 | 3.42 |
| Actual value | 53.11 | 7.51 | 3.28 |

The product was subjected to nuclear magnetic characterization. The results were as follows: The product was dissolved in $C_6D_6$ (about 0.4 mL), sealed, and characterized on a Unity Inova-400 NMR apparatus at room temperature: $^1$H NMR (400 MHz, $C_6D_6$): δ 7.28 (s, 6H), 4.94 (s, 3H), 3.83 (s, 4H), 3.57 (s, 4H), 1.73 (s, 12H), 1.16 (s, 30H) ppm.

Example 4: Synthesis of Ni[P(OR$^1$)$_3$][(R$^2$NCH$_2$CH$_2$NR$^2$)C]X$_2$ (R'=CH$_2$CH$_3$, R$^2$=C(CH$_3$)$_3$, X=Br)

Add a nitrogen heterocyclic carbene (R$^2$NCH$_2$CH$_2$NR$^2$)C (0.1438 g, 0.78 mmol) to a solution of di(triethyl phosphite) nickel dibromide (0.4290 g, 0.78 mmol) in tetrahydrofuran, react at room temperature for 1 hour, the solvent was removed in vacuum, the residue was washed with n-hexane, and the obtained residue is extracted by toluene, and the clear liquid is transferred, and solvent toluene is removed, so as to obtain a yellow solid, wherein the yield is 60%. The results of elemental analysis of the product are shown in Table 4:

TABLE 4

| Elemental analysis | | | |
| --- | --- | --- | --- |
| | C: (%) | H: (%) | N: (%) |
| Theoretical value | 35.95 | 6.74 | 4.93 |
| Actual value | 36.22 | 6.88 | 4.81 |

The product was subjected to nuclear magnetic characterization and the results are as follows:

The product was dissolved in $C_6D_6$ (ca. 0.4 mL), sealed, and characterized on a Unity Inova-400 NMR apparatus at room temperature: $^1$H NMR (400 MHz, $C_6D_6$): δ 4.29-4.07 (m, 5H), 2.73 (t, 4H), 2.26 (s, 6H), 2.00 (s, 9H), 1.10 (dt, 9H), 0.45 (s, 4H) ppm.

Example 5: Synthesis of Ni[P(OR$^1$)$_3$][(R$^2$NCH$_2$CH$_2$NR$^2$)C]X$_2$ (R$^1$=CH$_2$CH$_3$, R$^2$=C(CH$_3$)$_3$, X=Cl)

Add a nitrogen heterocyclic carbene (R$^2$NCH$_2$CH$_2$NR$^2$)C (0.1438 g, 0.78 mmol) to a solution of bis(triphenylphosphine)nickelchloride (0.5101 g, 0.78 mmol) in tetrahydrofuran, react at room temperature for 1 hour, and remove solvent in vacuo. The residue was washed with n-hexane, and the residue obtained was extracted with toluene, and the clear liquid is transferred, and solvent toluene is removed to give a pink solid, wherein the yield is 65%. Further, the pink solid (0.2870 g, 0.5 mmol) was mixed with triethyl phosphite (86 μL, 0.5 mmol), and tetrahydrofuran was added as a solvent, and the mixture was reacted at room temperature for 1 hour, and the solvent was evaporated in vacuo. The residue was washed with n-hexane, and the residue obtained was extracted with toluene, and t the clear liquid is transferred, and solvent toluene is removed to give a yellow solid, wherein the yield is 90%.

The results of elemental analysis of the product are shown in Table 5:

TABLE 5

| Elemental analysis | | | |
| --- | --- | --- | --- |
| | C: (%) | H: (%) | N: (%) |
| Theoretical value | 42.62 | 8.00 | 5.85 |
| Actual value | 42.95 | 8.11 | 5.73 |

The product was subjected to nuclear magnetic characterization and the results are as follows:

The product was dissolved in $C_6D_6$ (ca. 0.4 mL), sealed, and characterized on a Unity Inova-400 NMR apparatus at room temperature: $^1$H NMR (400 MHz, $C_6D_6$): δ 4.21 (dp, 6H), 2.91-2.59 (m, 4H), 2.31 (s, 6H), 2.04 (s, 12H), 1.20 (t, 3H), 1.00 (t, 6H) ppm.

Example 6: Ni[P(OR$^1$)$_3$][(R$^2$NCH$_2$CH$_2$NR$^2$)C]X$_2$=CH$_2$CH$_3$, R$^2$=2,4,6-trimethylphenyl, X=Br) Catalyzed Cross-Coupling Reaction of p-Chlorophenol and Bis(Neopentyl Glycolato)-Diboron Under argon protection, catalyst (17.3 mg, 0.025 mmol, 5 mol %), potassium methoxide (52.6 mg, 0.75 mmol), bis(neopentyl glycolato)-diboron (169.5 mg, 0.75 mmol), p-chlorophenol (49 μl, 0.50 mmol), 1.5 ml of 1,4-dioxane were sequentially added to the reaction flask, reacted at 40° C. for 6 hours, and quenched with water, the product was extracted with ethyl acetate and purified by column chromatography (a mixed solvent of ethyl acetate/petroleum ether in a volume ratio of 1:5 was used as a developing solvent), and the yield was 54%.

The product was dissolved in CDCl$_3$ (ca. 0.4 mL), sealed, and characterized on a Unity Inova-400 NMR apparatus at room temperature: $^1$H NMR (400 MHz, CDCl$_3$, TMS): δ 7.70 (d, 2H), 6.81 (d, 2H), 5.35 (s, 1H), 3.75 (s, 4H), 1.01 (s, 6H) ppm.

Example 7: Ni[P(OR$^1$)$_3$][(R$^2$NCH$_2$CH$_2$NR$^2$)C]X$_2$ (R$^1$=CH$_2$CH$_3$, R$^2$=2,4,6-trimethylphenyl, X=Br) Catalyzed Cross-Coupling Reaction of p-Chloroaniline and Bis(Neopentyl Glycolato)-Diboron Under argon protection, catalyst (17.3 mg, 0.025 mmol, 5 mol %), potassium methoxide (52.6 mg, 0.75 mmol), bis(neopentyl glycolato)-diboron (169.5 mg, 0.75 mmol), p-chloroaniline (63.8 mg, 0.50 mmol), 1.5 ml of 1,4-dioxane were sequentially added to the reaction flask, reacted at 40° C. for 6 hours, and quenched with water, and the product was extracted with ethyl acetate and purified by column chromatography (a mixed solvent of ethyl acetate/petroleum ether in a volume ratio of 1:5 was used as a developing solvent), and the yield was 66%.

The product was dissolved in CDCl$_3$ (ca. 0.4 mL), sealed, and characterized on a Unity Inova-400 NMR apparatus at room temperature: $^1$H NMR (400 MHz, CDCl$_3$, TMS): δ 7.61 (d, 2H), 6.66 (d, 2H), 3.78 (s, 2H), 3.74 (s, 4H), 1.01 (s, 6H) ppm.

Example 8: Ni[P(OR$^1$)$_3$][(R$^2$NCH$_2$CH$_2$NR$^2$)C]X$_2$ (R$^1$=CH$_2$CH$_3$, R$^2$=2,4,6-trimethylphenyl, X=Br) Catalyzed Cross-Coupling Reaction of p-Chlorobenzophenone and Bis(Neopentyl Glycolato)-Diboron Under argon protection, catalyst (17.3 mg, 0.025 mmol, 5 mol %), potassium methoxide (52.6 mg, 0.75 mmol), bis(neopentyl glycolato)-diboron (169.5 mg, 0.75 mmol), p-chlorobenzophenone (108 mg, 0.50 mmol), 1.5 ml of 1,4-dioxane were sequentially added to the reaction flask, reacted at 40° C. for 6 hours, quenched with water, and the product was extracted with ethyl acetate. The product was extracted with ethyl acetate and purified by column chromatography (mixed solvent of ethyl acetate/petroleum ether in a volume ratio of 1:20 as a developing solvent) in a yield of 58%.

The product was dissolved in CDCl$_3$ (ca. 0.4 mL), sealed, and characterized on a Unity Inova-400 NMR apparatus at room temperature: $^1$H NMR (400 MHz, CDCl$_3$, TMS): δ 7.97 (d, 2H), 7.88-7.79 (m, 4H), 7.64 (t, 1H), 7.53 (t, 2H), 3.86 (s, 4H), 1.10 (s, 6H) ppm.

Example 9: Ni[P(OR$^1$)$_3$][(R$^2$NCH$_2$CH$_2$NR$^2$)C]X$_2$ (R$^1$=CH$_2$CH$_3$, R$^2$=2,4,6-trimethylphenyl, X=Br) Catalyzed Cross-Coupling Reaction of p-Cyanochlorobenzene and Bis(Neopentyl Glycolato)-Diboron Under argon protection, catalyst (6.9 mg, 0.01 mmol, 2 mol %), potassium methoxide (52.6 mg, 0.75 mmol), bis(neopentyl glycolato)-diboron (169.5 mg, 0.75 mmol), p-cyanochlorobenzene (69 mg, 0.50 mmol), 1.5 ml of 1,4-dioxane were sequentially added to the reaction flask, reacted at 40° C. for 6 hours, quenched with water, the reaction product was extracted with ethyl acetate and purified by column chromatography(mixing solvent of ethyl acetate/petroleum ether in a volume ratio of 1:20 as a developing solvent) in a yield of 41%.

The product was dissolved in CDCl$_3$ (ca. 0.4 mL), sealed, and characterized on a Unity Inova-400 NMR apparatus at room temperature: $^1$H NMR (400 MHz, CDCl3, TMS): δ 7.93 (d, 2H), 7.67 (d, 2H), 3.83 (s, 4H), 1.08 (s, 6H) ppm.

The invention claimed is:

1. A method for preparing phenylboronic acid neopentyl glycol ester, comprising the steps of: sequentially adding catalyst, potassium methoxide, bis(neopentyl glycolato)-diboron, phenyl chloride and organic solvent in an inert gas atmosphere; reacting at 40° C. for 6 hours to obtain phenylboronic acid neopentyl glycol ester; the phenyl chloride is p-chlorophenol, p-chloroaniline, p-chlorobenzophenone or p-cyanochlorobenzene; the catalyst is used in an amount of 5% by mole of the phenyl chloride; the chemical structure of the catalyst is as follows:

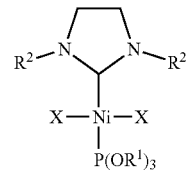

wherein R$^1$ is ethyl or isopropyl; R$^2$ is 2,4,6-trimethylphenyl, 2,6-diisopropylphenyl or tert-butyl; and X is bromine or chlorine.

2. The method for preparing phenylboronic acid neopentyl glycol ester according to claim 1, characterized in that after the reaction is completed, the reaction is terminated with water, the reaction product is extracted with ethyl acetate, and finally subjected to column chromatography to obtain phenylboronic acid neopentyl glycol ester.

3. The method for preparing phenylboronic acid neopentyl glycol ester according to claim 1, characterized in that the inert gas is argon; and the organic solvent is 1,4-dioxane.

4. The method for preparing phenylboronic acid neopentyl glycol ester according to claim 1, characterized in that the molar ratio of the catalyst, potassium methoxide, bis(neopentyl glycolato)-diboron and phenyl chloride is 0.05:1.5:1.5:1.

5. The method for preparing phenylboronic acid neopentyl glycol ester according to claim 1, characterized in that the catalyst is prepared as follows:

when X is bromine, the bis(phosphite) nickel dibromide and the nitrogen heterocyclic carbene are dissolved in a solvent in an inert gas, and reacted at room temperature for 2 to 4 hours; then the solvent is removed in vacuo, and the residue is extracted with toluene after washed with an n-hexane, and the clear solution was transferred and removed the solvent toluene to obtain a nickel (II) complex that is catalyst;

when X is chlorine, in an inert gas, the bis(triphenylphosphine)nickel dichloride and nitrogen heterocyclic carbene are dissolved in a solvent, and reacted at room temperature for 2 to 4 hours; then the solvent is removed in vacuo, and the residue is extracted with toluene after washed with an n-hexane, the clear solution is transferred and removed the solvent toluene to obtain nickel (II) complex containing triphenylphosphine and nitrogen heterocyclic carbene; then dissolving the mixed nickel (II) complex and phosphite in a solvent, and reacted at room temperature for 1 hour; then the solvent was removed in vacuo, the residue was washed with n-hexane and then extracted with toluene, and the clear solution was transferred and removed the solvent toluene to obtain nickel(II) complex, which was the catalyst.

6. The method for preparing phenylboronic acid neopentyl glycol ester according to claim 5, characterized in that in the preparation method of the catalyst, the inert gas is argon; the molar ratio of the bis(phosphite) nickel dibromide to the nitrogen heterocyclic carbene is 1:1; the molar ratio of bis(triphenylphosphine)nickel dichloride to nitrogen heterocyclic carbene is 1:1; the molar ratio of the mixed nickel (II) complex containing triphenylphosphine to the nitrogen heterocyclic carbene to the phosphite is 1:1; the solvent is tetrahydrofuran.

* * * * *